United States Patent
Ferkel et al.

(10) Patent No.: US 10,780,520 B2
(45) Date of Patent: Sep. 22, 2020

(54) METHOD FOR PRODUCING A HOT-ROLLED PLATED COMPOSITE MATERIAL, FLAT PRODUCT STACK, HOT-ROLLED PLATED COMPOSITE MATERIAL AND USE THEREOF

(71) Applicants: THYSSENKRUPP STEEL EUROPE AG, Duisburg (DE); thyssenkrupp AG, Essen (DE)

(72) Inventors: Hans Ferkel, Mülheim (DE); Stefan Myslowicki, Mönchengladbach (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 144 days.

(21) Appl. No.: 16/085,034

(22) PCT Filed: Mar. 2, 2017

(86) PCT No.: PCT/EP2017/054913
§ 371 (c)(1),
(2) Date: Sep. 14, 2018

(87) PCT Pub. No.: WO2017/157681
PCT Pub. Date: Sep. 21, 2017

(65) Prior Publication Data
US 2019/0084076 A1 Mar. 21, 2019

(30) Foreign Application Priority Data
Mar. 18, 2016 (DE) ........................ 10 2016 204 567

(51) Int. Cl.
*B23K 20/00* (2006.01)
*B23K 20/04* (2006.01)
(Continued)

(52) U.S. Cl.
CPC ............ *B23K 20/04* (2013.01); *B23K 20/227* (2013.01); *B23K 20/2336* (2013.01);
(Continued)

(58) Field of Classification Search
CPC .. B23K 20/04; B23K 20/227; B23K 20/2336; B23K 20/24; B23K 2103/04;
(Continued)

(56) References Cited

U.S. PATENT DOCUMENTS 2,395,878 A * 3/1946 Keene .................... B23K 20/04
29/509
3,150,436 A * 9/1964 Bomberger ............ B23K 20/04
29/17.6
(Continued)

FOREIGN PATENT DOCUMENTS

CN 1425530 A 6/2003
CN 101585838 A 3/2010
(Continued)

OTHER PUBLICATIONS

Machine translation of WO 2016/139083 (no date available).*
English Translation of International Search Report issued in PCT/EP2017/054913, dated May 16, 2017 (dated May 29, 2017).

*Primary Examiner* — Kiley S Stoner
(74) *Attorney, Agent, or Firm* — Avant Law Group, LLC

(57) ABSTRACT

A method for producing a hot-rolled clad composite material may involve cleaning surfaces of multiple flat products, at least one surface of which has a natural unevenness. The cleaned surfaces may then be connected and brought into contact by stacking the flat products. The flat products may then by regionally welded to create a flat product package. The method may further involve heating the flat product package to an initial hot-rolling temperature, hot-rolling the flat product package to form a hot strip, and either cutting the
(Continued)

hot strip into plates or sheets or coiling the hot strip to form a coil.

4 Claims, 2 Drawing Sheets

(51) Int. Cl.
*B23K 20/227* (2006.01)
*B23K 20/233* (2006.01)
*B23K 20/24* (2006.01)
B23K 103/04 (2006.01)
B23K 103/10 (2006.01)
B23K 103/16 (2006.01)

(52) U.S. Cl.
CPC .......... *B23K 20/24* (2013.01); *B23K 2103/04* (2018.08); *B23K 2103/10* (2018.08); *B23K 2103/166* (2018.08)

(58) Field of Classification Search
CPC .......... B23K 2103/10; B23K 2103/166; B23K 2101/06; B23K 2101/14; B23K 2101/24; B23K 2101/28
USPC ............................................ 228/235.2–235.3
See application file for complete search history.

(56) References Cited

U.S. PATENT DOCUMENTS

| | | | | |
|---|---|---|---|---|
| 3,496,625 A * | 2/1970 | Winter | ................... | B32B 15/01 428/611 |
| 3,971,120 A * | 7/1976 | Ruderer | ............... | B23K 20/227 29/460 |
| 4,141,482 A * | 2/1979 | Reynolds | ............... | B23K 20/04 228/158 |
| 4,610,070 A * | 9/1986 | Gold | ..................... | B23K 20/04 29/429 |
| 4,638,939 A * | 1/1987 | Yoshiwara | ............. | B23K 20/04 228/186 |
| 4,694,985 A * | 9/1987 | Ouchi | .................... | B23K 20/14 228/235.3 |
| 4,831,708 A * | 5/1989 | Yoshiwara | ............. | B23K 20/04 228/158 |
| 5,579,988 A * | 12/1996 | Schutz | .................. | B23K 20/04 228/186 |
| 6,427,904 B1 | 8/2002 | Groll | | |
| 2005/0273994 A1* | 12/2005 | Bergstrom | ............. | B23K 20/04 29/514 |
| 2013/0295443 A1* | 11/2013 | Stuth | .................. | H01M 2/0285 429/176 |
| 2016/0288248 A1* | 10/2016 | Itoh | ...................... | B21B 1/22 |
| 2017/0298493 A1* | 10/2017 | Mennucci | ................ | B32B 3/18 |
| 2018/0236750 A1* | 8/2018 | Becker | .................. | B23K 20/24 |
| 2018/0371573 A1* | 12/2018 | Kwon | .................... | C21D 10/00 |

FOREIGN PATENT DOCUMENTS

| | | | | |
|---|---|---|---|---|
| CN | 102009332 A | | 4/2011 | |
| DE | 15 77 105 A | | 4/1970 | |
| DE | 10 2005 006 606 B | | 3/2006 | |
| DE | 10 2010 036 944 B | | 1/2013 | |
| DE | 102014116949 A1 * | | 5/2016 | ........... B32B 15/011 |
| EP | 0 004 063 B | | 7/1981 | |
| EP | 1 105 245 A | | 6/2001 | |
| FR | 1465792 A * | | 1/1967 | ............. B23K 20/08 |
| GB | 1062320 A * | | 3/1967 | ........... B23K 20/227 |
| GB | 1 178 535 A | | 1/1970 | |
| JP | 63056373 A * | | 3/1988 | ............. B23K 20/04 |
| WO | WO-9938642 A1 * | | 8/1999 | ........... B23K 35/007 |
| WO | WO-2016139083 A * | | 9/2016 | |

* cited by examiner

Figure 1)

METHOD FOR PRODUCING A HOT-ROLLED PLATED COMPOSITE MATERIAL, FLAT PRODUCT STACK, HOT-ROLLED PLATED COMPOSITE MATERIAL AND USE THEREOF

CROSS REFERENCE TO RELATED APPLICATIONS

This application is a U.S. National Stage Entry of International Patent Application Serial Number PCT/EP2017/054913, filed Mar. 2, 2017, which claims priority to German Patent Application No. DE 10 2016 204 567.9, filed Mar. 18, 2016, the entire contents of both of which are incorporated herein by reference.

FIELD

The present disclosure generally relates to composite materials, including flat product packages, hot-rolled clad composite materials, and methods for producing hot-rolled clad composite materials.

BACKGROUND

In the automotive industry, new solutions for reducing fuel consumption are sought. Lightweight construction is in this case an essential component in order for it to be possible to reduce the vehicle weight. This can be achieved, inter alia, through the use of materials of increased strength. With the rise in strength, the bending capacity thereof usually decreases. In order, in spite of increased strength in order to realize lightweight construction, to also ensure the passenger protection that is necessary in the crash-relevant components, it is necessary to ensure that the materials used convert the energy introduced by a crash by deformation. This necessitates a high degree of forming capacity in particular in the crash-relevant components of a vehicle structure.

In industrial sectors, a large number of applications are known in which the components produced from a material, for example ball bearings, agricultural blades, plowshares etc., are subjected to abrasive wear. In order that acceptable service lives of the components can be achieved under use conditions, a hardness that is as high as possible is required. Related thereto, the processability or formability or the resistance to impact stress, which can cause brittle failure, is limited or increased manufacturing outlay is required in order for it to be possible to improve and/or optimize the properties, for example in the form of subsequent heat treatment (tempering) etc.

In both areas of application mentioned, the choice of material used is the result of a compromise between all the part requirements. One solution, which meets these requirements, is delivered by the use of material composites, since, in this regard, an adaptation of the material properties to different part requirements can take place locally.

For example, material composites can be produced by roll cladding, in particular by hot-roll cladding. For this purpose, a first and at least one second flat product are provided, wherein the flat products differ from one another with regard to at least one property. The flat products are stacked on top of one another, wherein at least those surfaces of the flat products that are assigned to one another and are to be connected are processed for cleaning prior to stacking. In order to produce a flat product package, the individual flat products are welded together at least regionally. The flat product package is heated to at least an initial hot-rolling temperature and subsequently hot-rolled to form a hot strip, wherein the hot strip can be subsequently cut into sheets or coiled to form a coil, cf. German patent DE 10 2005 006 606 B3. An essential aspect in that patent is that those surfaces of the flat products that are assigned to one another prior to stacking are subjected to a subtractive surface treatment in order to reduce the air gaps enclosed between the flat products after they have been united to a minimum or to substantially prevent same, such that adhesive bonding forces can act optimally during the connecting process. Listed as subtractive surface treatments are, inter alia, planing, grinding or milling, in order to set planarity at the surfaces of the flat products to be connected and in order as a result to be able to ensure substantially full contact between the surfaces of the flat products. It is very complicated and costly to carry out the abovementioned measures for providing flat products having planar surfaces.

In particular in hot-roll cladding, a connection is produced between the individual flat products at high pressure and high temperature by diffusion processes between the flat products. At those surfaces of the flat products that are to be connected, mixing of the properties of the flat-product partners takes place close to the surface, these being able, depending on the nature of the flat products and depending on the process conditions (temperature and dwell time), to extend from the surface far into the regions of the respective flat products, in particular problematically in the case of released interstitial atoms, for example carbon or nitrogen, which pass into adjacent flat products during the successive heat-treatment steps and can have a negative impact on the material properties of these flat products. With a view to the function of the flat products in the material composite, extensive preservation of the properties would be desirable compared with the monolithic solid material of the respectively individual flat products.

Thus a need exists for a method for producing a hot-rolled clad composite material, which method overcomes the drawbacks of the known prior art and can be implemented economically and relatively easily. A need also exists for a flat product package and a hot-rolled clad composite material.

BRIEF DESCRIPTION OF THE FIGURES

FIG. 1 is a flow diagram of an example method for producing a hot-rolled clad composite material.

DETAILED DESCRIPTION

Figure 2A:
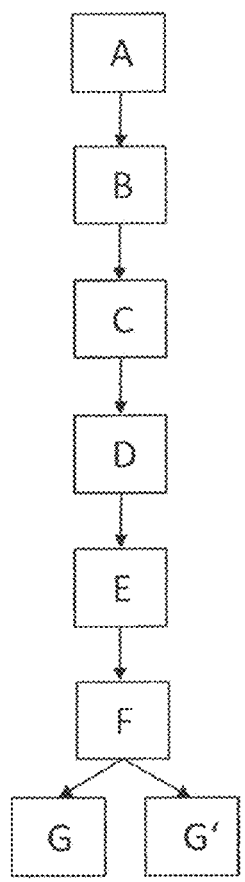
FIG. 2a is a schematic perspective view of an example flat product package.

Although certain example methods and apparatuses have been described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art. Some example methods for producing a hot-rolled clad composite material comprise the following steps:

providing a first and at least one second flat product, wherein the flat products differ from one another with regard to at least one property, stacking the flat products on top of one another, wherein at least those surfaces of the flat products that are assigned to one another and are to be connected are cleaned prior to stacking, at least regionally welding the individual flat products in order to create a flat product package, heating the flat product package to at least one initial hot-rolling temperature, hot-rolling the flat product package to form a hot strip, and cutting the hot strip into plates or sheets or coiling the hot strip to form a coil. The first and/or the second provided flat product may comprise a natural unevenness at least on one of its surfaces, and the flat product having the at least one surface with the natural unevenness may be oriented prior to stacking such that this surface is brought into contact with the surface of the other flat product. After stacking, the flat products are in contact regionally in a connecting plane via their surfaces.

The inventors have surprisingly found that, as a result of the omission of machining for producing planarity at those surfaces of the flat products that are to be connected, the method can be implemented more economically and more easily, with the result that flat products are provided which comprise at least one surface with a natural unevenness, which is intended to be connected to another surface of a flat product during the hot-roll cladding, said other surface likewise being able to be embodied as a natural surface. A surface with a natural unevenness is understood, according to the invention, to mean a production-related surface which, during the production of the respective flat product, is set to at least one surface, for example in terms of roughness and/or waviness (surface structure), and in the case of these surfaces, no measures have to be taken in order to create planar surfaces, as described in the prior art, for example by means of levelers, flattening devices or machining means (planing, milling, grinding). Alternatively or additionally, it is also possible for surfaces with a natural unevenness to be set in a targeted manner with a surface structure, for example by impressions in particular with repeating patterns. By means of the natural unevenness on at least one of the surfaces of the flat products, air gaps that are knowingly included by the stacking of the flat product package during the production thereof are accepted, these air gaps being able, depending on the flat product type and/or flat product thickness, to regionally comprise a gap size between the surfaces of up to 5 mm. Therefore, according to the invention, the flat products are in contact only regionally in a connecting plane (contact points or contact regions), wherein the rest of the connecting plane is formed by included air gaps. While the flat product package is being heated to at least an initial hot-rolling temperature, a very thin oxide layer of up to 10 μm forms in the regionally included air gaps at the prevailing temperatures. This oxide layer cannot be deformed during the hot-roll cladding, but ruptures as a result of the deformation during rolling by elongation of the hot-rolled clad composite material to be produced and is deposited locally in the form of oxidic particles in the rolling direction and across the width of the rolled material in the connecting region or in the connecting regions between the layers. The oxide layer formed, or the particles formed, can suppress diffusion regionally during and/or after rolling. Thus, by way of the invention, substantially all-over mixing of the properties at those surfaces of the flat products that are to be connected can be prevented in the connecting region and during the rest of the production of the hot-rolled clad composite material, and extension into the flat products can be reduced substantially to the contact regions.

A flat product, which defines a length, a width and a height, should be understood as being cast slabs, prerolled slabs, blooms, plate blanks or strip blanks, in particular made of a steel material. It is also possible to use aluminum alloys, nickel-based alloys, titanium alloys or magnesium alloys as flat products.

Properties should be understood as being at least the tensile strength, hardness and/or elongation at break of the respective flat product.

The sum of the areas (length×width of the flat product) of the flat products that are regionally in contact (contact points or contact regions) corresponds to at least 30%, in particular at least 35%, preferably at least 40%, particularly preferably at least 45% in the connecting plane. Regional contact regions with an area in the connecting plane of less than 30% are insufficient during hot-roll cladding for allowing a secure bond between the flat products during hot-roll cladding, or to ensure a permanent connection between the layers of the hot-rolled clad composite material, this being able to result in delamination of the hot-rolled clad composite material and/or in premature and unacceptable failure during the subsequent application/loading.

Since all-over contact of the surfaces assigned to one another between the flat products would result in all-over mixing close to the surface during heating, according to the invention, after stacking, as a result of the natural unevenness of the at least one surface to be connected, at least regionally included air gaps are present between the flat products, which take up the total area of at least 20%, in particular at least 25%, preferably at least 30%, particularly preferably at least 35% in the connecting plane. The area, with regard to the regionally included air gaps, is limited to at most 70%, since above this value, a connection between the flat products during hot-roll cladding is scarcely possible, or a permanent connection between the layers of the hot-rolled clad composite material cannot be reliably ensured.

Since, before they are used or provided, the flat products are usually stored in a normal environment, a rust layer can form at least regionally on the surfaces of the flat products, and this rust layer can also cover the abovementioned contact regions. With roll scale and/or rust in the contact region, a satisfactory connection between the flat products during hot-roll cladding is not possible. Therefore, according to a further configuration of the method according to the invention, at least those surfaces of the first and/or of the second flat product that are assigned to one another and are to be connected are cleaned such that the oxide layer and other disruptive particles, for example loose contaminants and/or adhesions, are removed, although the natural unevenness of the surface is substantially preserved. For this purpose, in particular pickling and/or sand blasting are suitable possibilities and surface-structure-preserving cleaning methods are preferably suitable in the main.

According to a further configuration of the method according to the invention, the flat products are welded together in a gastight manner. This has the advantage that, during the heating or through-heating of the flat product package for example in a walking beam furnace to an initial hot-rolling temperature which may be between 1100 and 1300° C., no exchange or penetration of furnace atmosphere can take place between the flat products, which would have a negative impact on the hot-rolling process, for example heavy scale formation with large pieces of scale could occur.

According to a further configuration of the method according to the invention, the hot strip produced is rolled to form a cold strip, with the result that a thickness of the hot-rolled clad composite material of between 0.2 and 2.5 mm can be created.

According to a second aspect, the invention relates to a flat product package, which comprises a first and at least one second flat product, wherein the flat products differ from one another with regard to at least one property, at least one of those surfaces of the flat products that are assigned to one another and are to be connected comprises a natural unevenness and as a result the flat products are in contact regionally in a connecting plane, as a result at least regionally included air gaps are present between the flat products, and the flat products are welded together in a gastight manner via a weld.

In order to avoid repetitions, reference is made to the advantageous configurations of the method according to the invention.

According to a third aspect, the invention relates to a hot-rolled clad composite material comprising a first and at least one second layer, wherein the layers differ from one another with regard to at least one property, which are connected together at least regionally via a connecting region, wherein oxidic particles are present at least regionally in the connecting region.

In order to avoid repetitions, reference is made to the advantageous configurations of the method according to the invention.

According to a first configuration of the composite material according to the invention, the particles are present in the connecting region with a total proportion by area of between 0.05% and 20%, for example between 0.1% and 10%, in particular between 0.3% and 5%. In this order of magnitude, a reliable and permanent connection between the layers within the hot-rolled clad composite material can be ensured.

According to a further configuration of the composite material according to the invention, the hot-rolled clad composite material is present as a hot strip in the form of a plate or sheet or in the form of a coil, and its thickness is <26 mm, in particular <20 mm, preferably <15 mm, particularly preferably <10 mm.

According to a fourth aspect, the invention relates to the use of a hot-rolled clad composite material according to the invention as a part or a component in sectors with wear influences, in mechanical engineering and plant engineering, in the construction sector, in vehicle construction, in railroad construction, in shipbuilding or in aerospace.

FIG. 1) illustrates a flow diagram of an exemplary embodiment of a method according to the invention for producing a hot-rolled clad composite material. At least two flat products preferably made of a steel material, which are formed in a cuboidal manner in the form of cast slabs, prerolled slabs, blooms, plate blanks or strip blanks, are provided, wherein the flat products differ from one another with regard to at least one property (tensile strength, hardness and/or elongation at break) [step A]. The first and/or the second provided flat product comprises, at least on one of its surfaces, a natural unevenness, which is intended to be connected to another surface of a flat product, which can likewise be embodied as a natural surface, during hot-roll cladding. The surface with a natural unevenness can be set for manufacturing reasons with a surface structure (roughness and/or waviness) and does not comprise a planar surface. Alternatively or additionally, it is also possible for surfaces with a natural unevenness to be set in a targeted manner with a surface structure.

At least those surfaces of the first and/or of the second flat product that are to be connected are cleaned, in order to remove the layer of rust that has formed on the surface for example while the flat products are being stored, and optionally other disruptive particles located on the surface. Cleaning is carried out in this case such that the natural unevenness of the surface is substantially preserved [step B].

Following cleaning, the first and the at least second flat product are stacked on top of one another, wherein the first and/or the second flat product having the at least one surface with the natural unevenness is oriented prior to stacking such that this surface is brought into contact with the surface of the other flat product, wherein, following stacking, the flat products are in contact regionally in a connecting plane via their surfaces [step C].

Following stacking, the individual flat products are welded together at least regionally to produce a flat product package. Preferably, the flat products are welded together in a gastight manner in order to prevent exchange or penetration of furnace atmosphere between the flat products during subsequent heating of the flat product package [step D].

The flat product package is heated or through-heated to at least an initial hot-rolling temperature, for example in a walking beam furnace at for example temperatures of between 1100 and 1300° C. [step E]. Since the flat products are in contact only regionally in a connecting plane (contact points or contact regions) and the rest of the connecting plane consists of included air gaps, a thin oxide layer forms through or in the included air gaps at the prevailing temperatures.

Once the at least initial hot-rolling temperature has been reached, the flat product package is rolled, following a particular pass sequence, to form a hot strip, which forms the hot-rolled clad composite material [step F]. The oxide layer that has arisen on account of the heating cannot be deformed during the hot-roll cladding, but ruptures on account of the deformation by rolling by elongation of the hot-rolled clad composite material to be produced and is deposited locally in the form of oxidic particles in the rolling direction and across the width of the rolled material in the connecting region or in the connecting regions between the layers. The formed oxide layer or particles can regionally suppress diffusion during and/or after rolling and thus full mixing of the properties in the connecting region or in the connecting regions between layers can be prevented.

Following completion of rolling, the hot strip is either cut to length to form plates or sheets [step G] or coiled to form a coil [step G'] and made available to the processing industry. The hot strip can if necessary be rolled to form a cold strip.

Figure 2B:
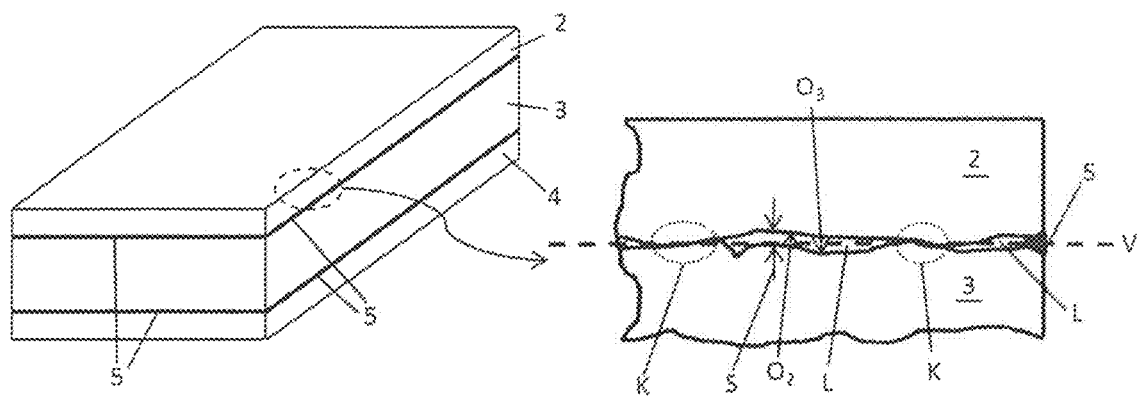
FIG. 2b is a partial sectional view through the region indicated in FIG. 2a of the example flat product package.

FIG. 2a) illustrates an exemplary embodiment of a flat product package (1) according to the invention in a schematic, perspective view, wherein the flat product package (1) has been produced for example by the abovementioned method steps [A]-[D]. The flat product package (1) consists of three flat products (2, 3, 4). The flat product (3) is for example a slab that has a thickness of 220 mm and is made of a for example ductile steel material with a C content of less than 0.15% by weight, and acts as the core of the flat product package (1). The core (3) is covered by two flat products (2, 4) that have in each case for example a thickness of 30 mm and are made in each case of a for example heat-treatable steel material having a C content of more than 0.2% by weight, resulting in an overall thickness of 280 mm. The flat products (2, 3, 4) have been welded together in a gastight manner via a weld (5), wherein the weld (5) can also comprise a plurality of weld seams. The partial view in FIG. 2b) shows that at least one, preferably both of those surfaces ($O_2$, $O_3$) of the flat products (2, 3) that are assigned to one another and are to be connected comprise a natural unevenness and as a result the flat products (2, 3) are in contact (K) regionally in a connecting plane (V) and as a result at least regionally included air gaps (L) are present between the flat products (2, 3). The sum of the areas of the flat products (2, 3) that are regionally in contact (K) corresponds to at least 30%, in particular at least 35%, preferably at least 40%, particularly preferably at least 45% in the connecting plane (V) and the included air gaps (L) regionally present between the flat products (2, 3) take up a total area of at least 20%, in particular at least 25%, preferably at least 30%, particularly preferably at least 35% in the connecting plane (V). By means of the natural unevenness on at least one of the surfaces ($O_2$, $O_3$) of the flat products (2, 3), the included air gaps (L) can regionally comprise a gap size (S) between the surfaces ($O_2$, $O_3$) of up to 5 mm. Those surfaces of the flat products (3, 4) that are assigned to one another and are to be connected likewise each comprise a natural unevenness and correspond substantially to the configurations of the surfaces ($O_2$, $O_3$), not illustrated here.

The flat products (2, 3, 4) can of course also comprise other thicknesses, in particular also other thickness ratios. For example, an asymmetric structure is also conceivable. Depending on the application, the flat product package can be constructed individually. For example, a heat-treatable steel material having a C content of over 0.2% by weight can be used as the core and two steel materials that each have a C content of less than 0.15% by weight can be used as outer layers for constructing the flat product package.

Figure 3B:
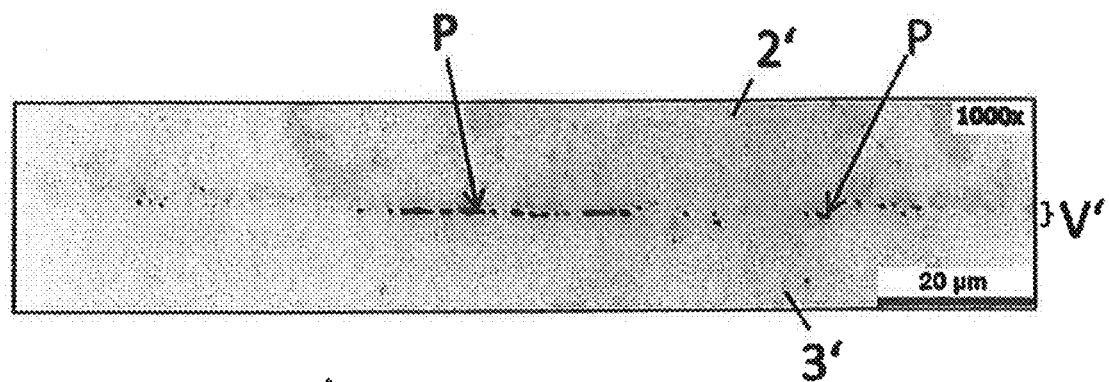
FIG. 3b is a partial sectional view through the region indicated in FIG. 3a of the example hot-rolled clad composite material.
Figure 3A:
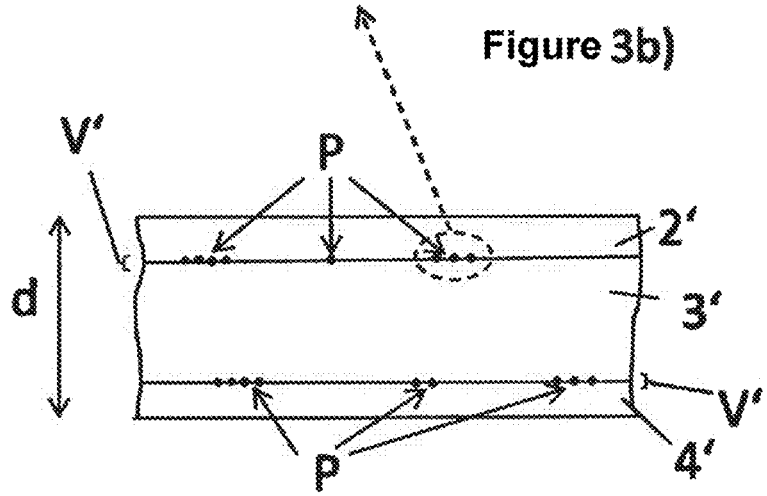
FIG. 3a is a schematic longitudinal sectional view through an example hot-rolled clad composite material.

FIG. 3a) illustrates an exemplary embodiment of a hot-rolled clad composite material (1') according to the invention in a schematic longitudinal section. The flat product package (1), shown in FIG. 2a), having the individual flat products (2, 3, 4) has been heated, cf. description for method step [E], and rolled to form a hot strip with a thickness (d)<26 mm, particularly preferably <10 mm, cf. description for method step [F]. The rolled clad composite material (1') also comprises substantially three layers (2', 3', 4'). The scale layer that has arisen in the included air gaps (L) as a result of the heating cannot be deformed during hot-roll cladding, but ruptures as a result of the pressure action by rolling in conjunction with a thickness reduction and, associated therewith, an elongation of the hot-rolled clad composite material to be produced, and is deposited in the form of oxidic particles (P) locally in the rolling direction and locally across the width of the rolled material in the connection regions (V') between the layers (2', 3') and (3', 4'), as shown in the enlarged detail in FIG. 3b). The particles (P) in the connecting region (V') or in the connection regions are present with a proportion by area of between 0.05% and 20%, in particular between 0.3% and 5%. The oxidic particles (P) do not have a negative effect on the formation of the connecting region (V') during hot-roll cladding.

Hot-rolled clad composite materials (1') according to the invention can be used everywhere in sectors in which lightweight construction is pursued, for example in vehicle construction, railroad construction, shipbuilding or aerospace. It can also be used in sectors with wear influences, in the construction sector, in plant engineering and mechanical engineering.

The invention is not limited to the exemplary embodiments illustrated in the drawing or to the configurations in the general description, but rather, in addition to plate-form or slightly deformed, for example deep-drawn semifinished products, it is also possible for closed profiles with for example a circular cross section to be produced from hot-rolled clad composite materials according to the invention, such that even sectors with abrasively acting media routing, for example pipelines for delivering liquid concrete etc., can be served appropriately.

LIST OF REFERENCE SIGNS

1 Flat product package
1' Hot-rolled clad composite material, hot strip
2, 3, 4 Flat product
2', 3', 4' Layers
5 Weld
A, B, C, D, E, F, G, G' Method steps
d Thickness
K Contact, contact region
L Included air gap
$O_2$, $O_3$ Surface with natural unevenness
P Oxidic particles
S Gap size
V Connecting plane
V' Connecting region

What is claimed is:

1. A flat product package comprising:
a first flat product with a surface that includes a natural unevenness;
a second flat product that is different from the first flat product with respect to at least one property, wherein a surface of the second flat product is connected to the surface of the first flat product such that the first and second flat products are in contact regionally in a connecting plane, wherein air gaps are included at least regionally between the first and second flat products; and
a weld by which the first and second flat products are welded together in a gastight manner,
wherein:
a sum of areas where the first and second flat products are regionally in contact corresponds to at least 30% in the connecting plane; and
a total area where the air gaps are present occupies at least 20% in the connecting plane.

2. A hot-rolled clad composite material comprising: a first layer;
a second layer that is different from the first layer with respect to at least one property, the first and second layers being connected together at least regionally via a connecting region produced by hot-rolling the flat product package of claim 1; and
oxidic particles disposed at least regionally in the connecting region.

3. The hot-rolled clad composite of claim 2 wherein oxidic particles are disposed in the connecting region in a proportion of between 0.05% and 20%.

4. The hot-rolled clad composite of claim 2 configured as a hot strip in a form of a plate, a sheet, or a coil, wherein a thickness of the hot strip is less than 26 mm.

* * * * *